United States Patent
Rajagopalan et al.

(10) Patent No.: US 9,116,774 B2
(45) Date of Patent: Aug. 25, 2015

(54) FIRMWARE UPDATES FOR MULTIPLE PRODUCT CONFIGURATIONS

(71) Applicant: SANDISK TECHNOLOGIES INC., Plano, TX (US)

(72) Inventors: Saranyan Rajagopalan, San Jose, CA (US); Oded Karni, Sunnyvale, CA (US); Kevin Leigh Goodwin, San Jose, CA (US); Nolen Velasco, Union City, CA (US); Kunal Ramachandra Shenoy, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/894,206

(22) Filed: May 14, 2013

(65) Prior Publication Data

US 2014/0344797 A1    Nov. 20, 2014

(51) Int. Cl.
*G06F 9/44* (2006.01)
*G06F 9/445* (2006.01)

(52) U.S. Cl.
CPC .. *G06F 8/65* (2013.01); *G06F 8/61* (2013.01); *G06F 8/64* (2013.01); *G06F 8/665* (2013.01); *G06F 8/71* (2013.01)

(58) Field of Classification Search
CPC .................. G06F 8/60–8/74; G06F 8/665
See application file for complete search history.

(56) References Cited

U.S. PATENT DOCUMENTS

| | | | |
|---|---|---|---|
| 5,600,807 A | 2/1997 | Itoh et al. | |
| 5,826,075 A | 10/1998 | Bealkowski et al. | |
| 6,425,125 B1 | 7/2002 | Fries et al. | |
| 6,668,374 B1 | 12/2003 | Sten et al. | |
| 6,996,819 B1 * | 2/2006 | Alanis | 717/173 |
| 7,003,656 B2 | 2/2006 | Chheda et al. | |
| 7,043,664 B1 | 5/2006 | Chiloyan | |
| 7,082,549 B2 | 7/2006 | Rao et al. | |
| 7,543,118 B1 | 6/2009 | Chen et al. | |
| 7,562,208 B1 | 7/2009 | Reed et al. | |
| 8,286,156 B2 | 10/2012 | Gavens et al. | |
| 8,392,895 B2 * | 3/2013 | Tsai et al. | 717/140 |
| 2002/0086688 A1 | 7/2002 | Kang | |
| 2002/0092008 A1 | 7/2002 | Kehne et al. | |
| 2002/0188886 A1 | 12/2002 | Liu et al. | |

(Continued)

FOREIGN PATENT DOCUMENTS

| | | |
|---|---|---|
| TW | 592334 | 6/2004 |
| TW | 594571 | 6/2004 |
| WO | WO2008/058101 | 5/2008 |

OTHER PUBLICATIONS

Lyu, Janghoon, et al., "A Procedure-Based Dynamic Software Update", 2001, pp. 271-280.*

(Continued)

*Primary Examiner* — Thuy Dao
*Assistant Examiner* — Christopher Franco
(74) *Attorney, Agent, or Firm* — Brinks Gilson & Lione (57) ABSTRACT

Techniques described herein relate to updating firmware of multiple non-volatile memory devices having diverse configurations using a common update file. The non-volatile memory device may include a flash memory device having a non-volatile memory array. Particular implementations described herein relate to circuits, devices, systems, and methods that update, with a common update file, firmware residing on multiple non-volatile memory devices having diverse configurations.

19 Claims, 5 Drawing Sheets

(56) References Cited

U.S. PATENT DOCUMENTS

| | | | |
|---|---|---|---|
| 2003/0066062 A1* | 4/2003 | Brannock et al. | 717/169 |
| 2004/0199825 A1 | 10/2004 | Zeller et al. | |
| 2005/0144367 A1 | 6/2005 | Sinclair | |
| 2005/0160217 A1 | 7/2005 | Gonzalez et al. | |
| 2005/0188239 A1 | 8/2005 | Golasky et al. | |
| 2005/0188366 A1* | 8/2005 | Chang | 717/168 |
| 2005/0223373 A1 | 10/2005 | Gage et al. | |
| 2006/0070058 A1 | 3/2006 | Menahemi et al. | |
| 2007/0033362 A1 | 2/2007 | Sinclair | |
| 2007/0288914 A1* | 12/2007 | Brannock et al. | 717/169 |
| 2008/0109647 A1 | 5/2008 | Gavens et al. | |
| 2008/0109798 A1 | 5/2008 | Gavens et al. | |
| 2009/0282399 A1* | 11/2009 | Kamrowski | 717/174 |
| 2010/0175062 A1* | 7/2010 | Kim | 717/173 |
| 2010/0180265 A1* | 7/2010 | Tsai et al. | 717/140 |
| 2010/0318983 A1* | 12/2010 | Hung et al. | 717/168 |
| 2012/0124568 A1* | 5/2012 | Fallon et al. | 717/169 |
| 2013/0111455 A1* | 5/2013 | Li et al. | 717/169 |
| 2013/0145353 A1* | 6/2013 | Tsai et al. | 717/140 |
| 2014/0068592 A1* | 3/2014 | Chitre et al. | 717/171 |

OTHER PUBLICATIONS

Felser, Meik, et al., "Dynamic Software Update of Resource-Constrained Distributed Embedded Systems", 2007, pp. 387-400.*

Ferreira, Alexandre Miguel, et al., "Android OTA Update", 2013, pp. 1-19.*

Bing, Benny, "A Fast and Secure Framework for Over-the-Air Wireless Software Download Using Reconfigurable Mobile Devices", 2006, pp. 58-63.*

Kim, Jinsik, et al., "Remote Progressive Firmware Update for Flash-Based Networked Embedded Systems", 2009, pp. 407-412.*

Chang, Yao-Chung, et al., "Dynamic Software Update of Model for Remote Entity Management of Machine-to-Machine Service Capability", 2012, pp. 32-39.*

US Office Action dated Mar. 31, 2011 issued in U.S. Appl. No. 11/594,283.

US Final Office Action dated Sep. 15, 2011 issued in U.S. Appl. No. 11/594,283.

US Office Action dated Jan. 23, 2012 issued in U.S. Appl. No. 11/594,283.

US Notice of Allowance dated May 23, 2012 issued in U.S. Appl. No. 11/594,283.

US Notice of Allowance dated Jul. 27, 2012 issued in U.S. Appl. No. 11/594,283.

US Office Action dated Mar. 31, 2011 issued in U.S. Appl. No. 11/594,583.

PCT Invitation to Pay Fees and Communication Relating to the Results of the Partial Search Report dated Jul. 10, 2008 issued in PCT/US2007/083704.

PCT International Search Report dated Nov. 24, 2008 issued in PCT/US2007/083704.

PCT Written Opinion dated Nov. 24, 2008 issued in PCT/US2007/083704.

PCT International Preliminary Report on Patentability and Written Opinion dated May 12, 2009 issued in PCT/US2007/083704.

Taiwanese Search Report dated Apr. 29, 2011 issued in TW Application No. 096142097.

* cited by examiner

| Offset | Length in Bytes | Field | |
|---|---|---|---|
| 0 | 4 | Sector length of associated UBF<br><br>(If this field is set to zero, then no more UBF | 501 |
| 4 | 4 | Capacity of target configuration this UBF is meant for | 502 |
| 8 | 80 | List of F/W versions compatible with associated UBF<br><br>(Ten 8-Byte Entries) | 503 |
| 88 | 80 | Reserved for future expansion of the version list | 504 |

FIRMWARE UPDATES FOR MULTIPLE PRODUCT CONFIGURATIONS

TECHNICAL FIELD

This disclosure relates generally to memory device firmware, and more particularly to upgrading, with a common update file, firmware residing on multiple non-volatile memory devices having diverse configurations.

DESCRIPTION OF THE RELATED TECHNOLOGY

Nonvolatile memory systems, such as flash memory, have been widely adopted for use in host systems such as computers, personal electronic devices, cameras, and other consumer and industrial systems. Examples of nonvolatile memory systems include memory cards, USB flash drives, and removable SSDs. Nonvolatile memory systems may be embedded in a large variety of host systems. For example, the nonvolatile memory system may be used with a personal computer, for example, as a Solid State Drive (SSD). Some nonvolatile memory systems may be detachably connected to a host system and may be interchanged between a number of different host systems, each host having different characteristic processing and voltage regulation capabilities.

Electronic circuit cards, including non-volatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls and supports operation of the memory cell array and interfaces with a host to which the card is connected. Several of the same type of card may be interchanged in a host card slot designed to accept that type of card. Memory card standards include PC Card, CompactFlash™ card (CF™ card), SmartMedia™ card, MultiMediaCard (MMC™), Secure Digital (SD) card, miniSD™ card, Subscriber Identity Module (SIM), Memory Stick™, Memory Stick Duo card and microSD/TransFlash™ memory module standards.

The above-identified types of memory devices usually implement a file system for managing directories and files, including system files. System files typically contain firmware instructions (which may be referred to as "flashware"). The flashware may include instructions for initializing the flash memory card, and for interfacing a host electronic device with a memory space in a non-volatile memory. The firmware instructions may require upgrading from time to time so as to correct "bugs" and other deficiencies, to incorporate new features, and/or to accommodate evolving customer requirements.

Techniques for upgrading firmware are disclosed in U.S. Pat. No. 8,286,156, assigned to the assignee of the present invention, the disclosure of which is hereby incorporated by reference in its entirety in the present application for all purposes.

In the absence of the presently disclosed techniques, a firmware update process may be costly and time consuming when diverse configurations of multiple memory devices are required to be updated. For example, when it is necessary to implement a particular "bug fix" on a number of memory devices, each having an associated "configuration" of memory capacity and existing firmware version, that may vary from device to device, a separate update file for each configuration ordinarily needs to be created. Subsequently, it is ordinarily necessary to make a manual selection of the correct update file for the particular configuration associated with each device.

As a result, improved techniques for upgrading firmware residing on multiple non-volatile memory devices having diverse configurations are desirable.

SUMMARY

This disclosure provides examples of circuits, devices, systems, and methods for upgrading firmware residing on multiple non-volatile memory devices having diverse configurations. In one aspect, firmware instructions on a first device are updated by: receiving, at the first device, a file that includes at least two different firmware update files, each firmware update file including a respective file header, each file header having information about a corresponding set of intended firmware configuration targets, the first device including a first set of firmware instructions of a first configuration; executing a first update, by the first device, of the first set of firmware instructions by replacing at least a first portion of the first set of firmware instructions with at least a second portion of a selected one or more of the at least two different firmware update files. Prior to executing the update, the first set of firmware instructions causes the first device to parse the respective file headers such that the selected one or more firmware update files include only those firmware update files for which the first configuration is included in the corresponding set of intended firmware configuration targets.

In an implementation, the file is received at a second device, the second device including a second set of firmware instructions of a second configuration. A second update is executed, by the second device, of the second set of firmware instructions by replacing at least a first portion of the second set of firmware instructions with at least a third portion of a selected one of the at least two different firmware update files. Prior to executing the second update, the second set of firmware instructions causes the second device to parse the respective file headers such that the selected one or more firmware update files include only those firmware update files for which the second configuration is included in the corresponding set of intended firmware configuration targets.

In another implementation, the first configuration may define a memory capacity of the first device and an existing firmware version of the first device. The information may include memory capacity, and firmware version of each intended firmware configuration target.

In a further implementation, a subsequent update is executed, by the first device, of an existing set of firmware instructions on the first device by replacing at least a third portion of the existing firmware instructions with at least a fourth portion of a different selected one of the at least two different firmware update files. Prior to executing the subsequent update, the existing set of firmware instructions causes the first device to parse the respective file headers such that the selected one or more intended firmware update files include only those firmware update files for which the first configuration is included in the corresponding set of intended firmware configuration targets.

Is an implementation, the first device may include a non volatile memory array. The non volatile memory array may include a flash memory.

In a yet further implementation, an apparatus includes a non-volatile memory array, the non-volatile memory array including firmware instructions; and a memory controller; the memory controller configured to: (i) receive a file, the file including at least two different firmware update files, each firmware update file including a respective file header, each file header having information about a corresponding set of intended firmware configuration targets, the apparatus including a first set of firmware instructions of a first configuration; and (ii) execute a first update of the first set of firmware instructions by replacing at least a first portion of the first set of firmware instructions with at least a second portion of a selected one of the at least two different firmware update files. Prior to executing the update, the first set of firmware instructions causes the apparatus to parse the respective file headers such that the selected one or more intended firmware update files include only those firmware update files for which the first configuration is included in the corresponding set of intended firmware configuration targets.

In yet another aspect, a non-transitory computer-readable storage medium having stored thereon instructions which, when executed by a controller, cause the controller to perform operations, the operations including: (i) receiving, at the first device, a file, the file including at least two different firmware update files, each firmware update file including a respective file header, each file header having information about a corresponding set of intended firmware configuration targets, the first device including first set of firmware instructions of a first configuration; and (ii) executing a first update, by the first device, of the first set of firmware instructions by replacing at least a first portion of the first set of firmware instructions with at least a second portion of a selected one or more of the at least two different firmware update files. Prior to executing the update, the first set of firmware instructions causes the first device to parse the respective file headers such that the selected one or more firmware update files include only those firmware update files for which the first configuration is included in the corresponding set of intended firmware configuration targets.

BRIEF DESCRIPTION OF THE DRAWINGS

Like reference numbers and designations in the various drawings indicate like elements.

DETAILED DESCRIPTION

This disclosure provides examples of circuits, devices, systems, and methods for upgrading firmware residing on a non-volatile memory device. Particular implementations described herein relate to circuits, devices, systems, and methods that update, with a common update file, firmware residing on multiple non-volatile memory devices having diverse configurations.

The circuits described herein can be utilized in a variety of applications. In some implementations, the circuits described herein are used in digital electronic devices or systems. For example, in some implementations, the circuits described herein can be used in a memory device. For example, the circuits can be used in solid state memory devices such as memory cards, USB flash drives, and removable SSDs. In some implementations, the circuits can be input/output I/O circuits (or interfaces) for a controller, such as a memory controller. In some implementations, the memory controller can be used in a host interface for a memory card such as, for example, a PC Card, a compact flash (CF™) card, a Smart-Media™ card, a MultiMediaCard (MMC™), a Secure Digital (SD) card, a mini or micro SD™ card, a SIM card, a Memory Stick™ card, a Memory Stick Duo card, TransFlash™ card, a Compact Flash card, or an iNAND card.

Although each of these cards may have a unique mechanical and/or electrical interface according to its standardized specifications, the flash memory system included in each may be similar. These cards are all available from the assignee of the present application which also provides a line of flash drives under its Cruzer trademark, such flash drives being hand held memory systems in small packages that have a Universal Serial Bus (USB) plug for connecting with a host by plugging into the host's USB receptacle. Each of these memory cards and flash drives includes a controller that interfaces with a respective host and controls operation of the flash memory within the card or device.

Generally, various implementations described herein can be used in any memory card or flash memory device in which it is desirable to permit firmware updates of multiple non-volatile memory devices having diverse configurations to be performed using a common update file.

Figure 1:
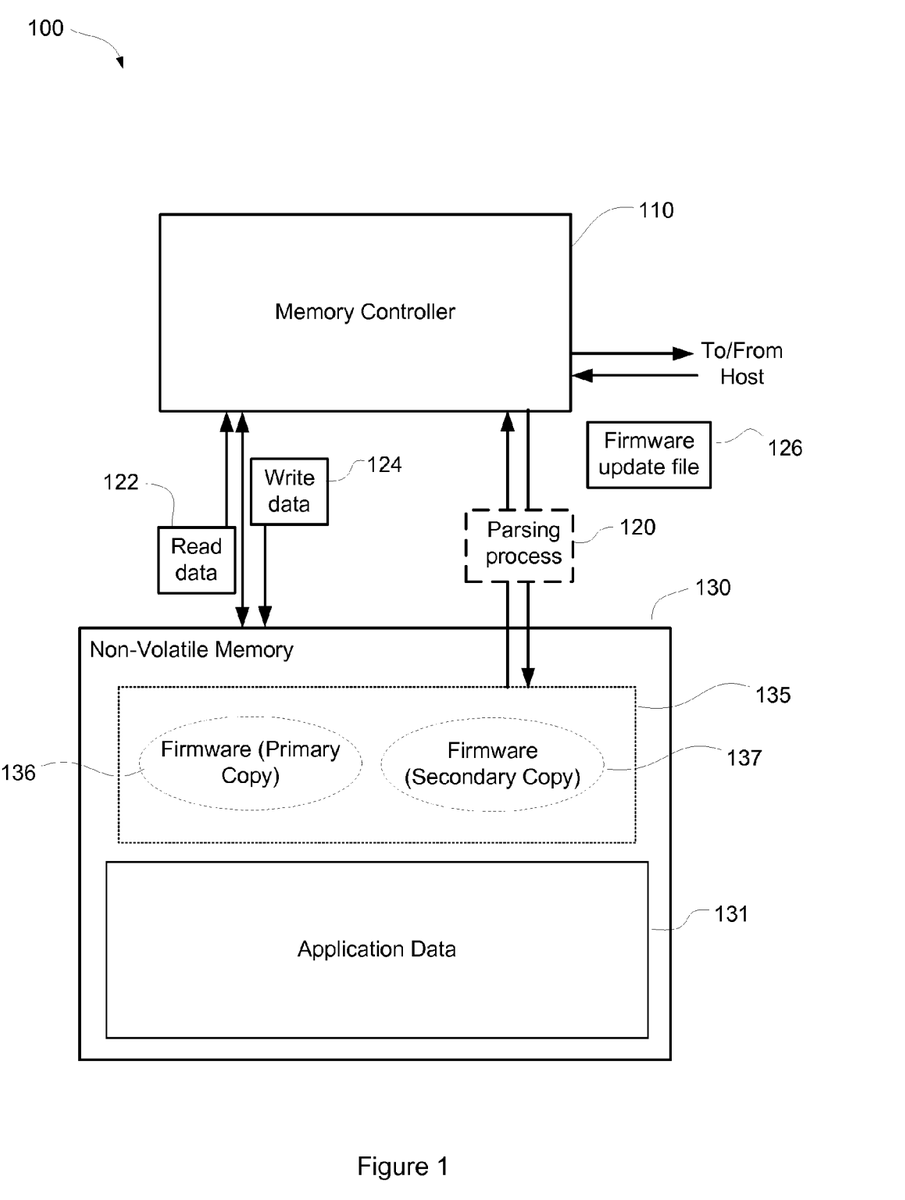
FIG. 1 is a block diagram of an apparatus for upgrading firmware stored in a non-volatile memory.

An apparatus that may be suitable for use in implementing aspects of the invention is shown in FIG. 1. In the example shown, apparatus 100 includes memory controller 110 and non-volatile memory 130. Non-volatile memory 130 may include firmware 135 and application data 131 stored for an electronic device (not illustrated). Firmware 135 may include locations for a first copy ("primary copy") 136 of firmware, and a second copy ("secondary copy") 137 of firmware. Memory controller 110 may be configured to implement firmware updating in accordance with the presently disclosed techniques.

In addition, memory controller 110 may be configured to read data 122 from, and write data 124 to, primary copy 136 and/or application data 131, while memory controller 110 replaces at least a portion of secondary copy 137 with updated firmware ("firmware update file") 126.

Firmware update file 126, upon receipt from a host (not illustrated), may undergo a parsing process 120 that determines which, if any, portions of firmware update file 126 should be used to update firmware 135. It will be appreciated that parsing process 120 may be executed by memory controller 110 under instructions of existing firmware 135, for example. More particularly, memory controller 110 may execute parsing process 120 under instructions of existing primary copy firmware 136, and replace at least a portion of secondary copy 137 with those portions of firmware update file 126 selected as a result of parsing process 120.

As will be described in more detail hereinbelow, parsing process 120 may be configured to parse respective file headers of a concatenated series of update binary files (UBF) that are included in firmware update 126. For example, update file 126 may include at least two different UBF's, each UBF including a respective file header. Each file header may include information about a corresponding set of intended firmware configuration targets.

Parsing process 120 may compare configuration information associated with non-volatile memory 130 with information in each respective file header. Configuration information may include, for example, version identification of existing firmware 135 and capacity of non-volatile memory 130. Parsing process 120 may be configured to select, based on the information in each respective file header, one or more UBFs such that the selected UBFs include only those firmware update files for which the configuration information associated with non-volatile memory 130 is included in the corresponding set of intended firmware configuration targets.

As used herein, the term "firmware," at least in one embodiment, refers to executable instructions and/or data used to facilitate functionality of a removable memory card and/or non-volatile memory as a data store. In some cases, firmware can be used to implement system files. Note that one or more of the elements described in FIG. 1 (as well as the elements described subsequent to FIG. 1) can be implemented in either software (firmware) or hardware, or both. Note, too, that the elements and their functionality described in FIG. 1 (and in other figures) can be aggregated with one or more other elements, or, alternatively, the elements and their functionality can be subdivided into constituent sub-elements, if any.

Figure 2:
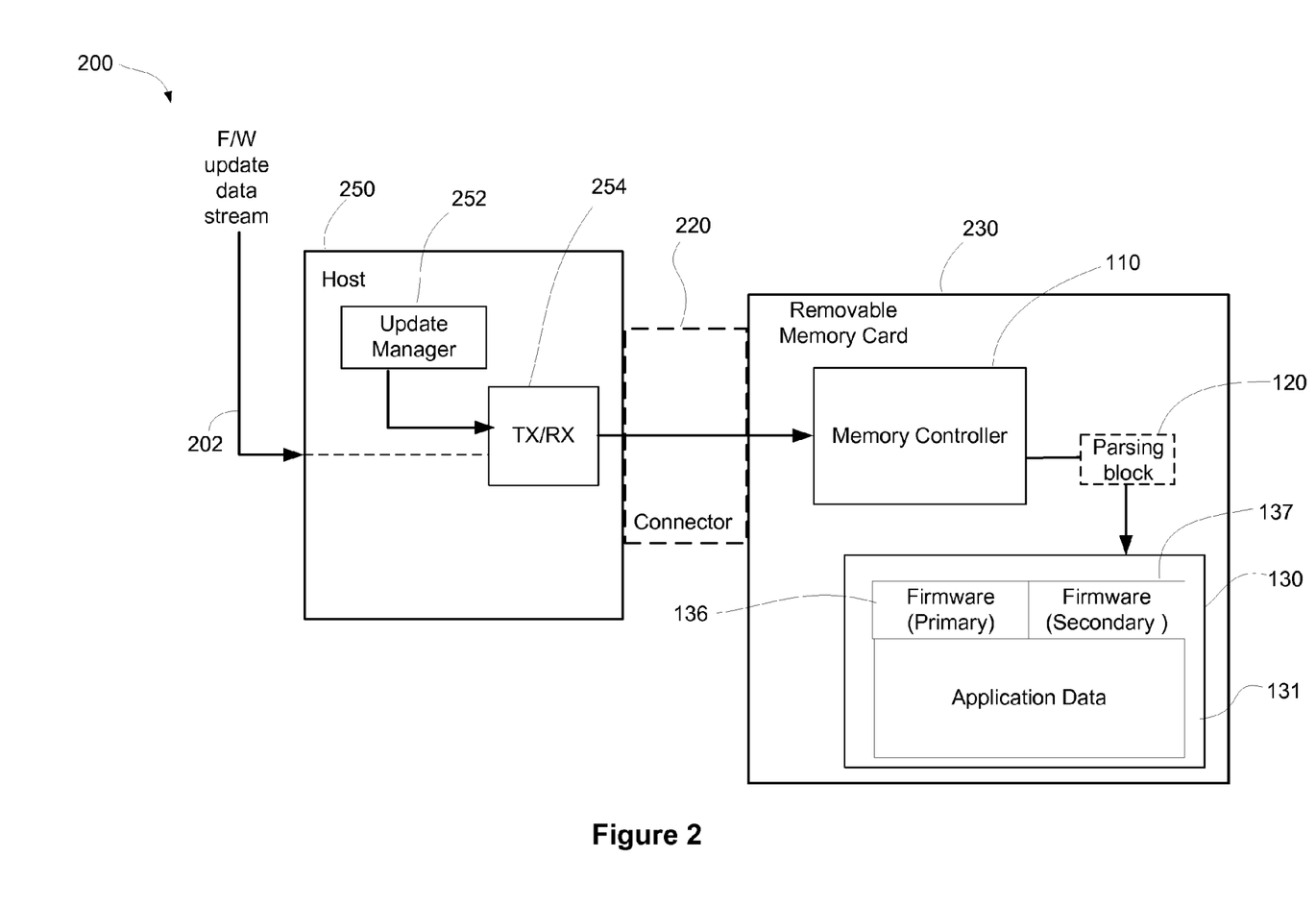
FIG. 2 is a block diagram of a system including a host and a removable memory card for performing firmware updates.

Referring now to FIG. 2, a block diagram of system 200 including host 250 and removable memory card 230 is illustrated. System 200 may perform firmware updates in accordance with the present teachings. In the example shown, host 250 can be any electronic device capable of using removable memory card 230 as storage. Host 250 may receive a firmware ("F/W") update data stream 202 from a remote source (not illustrated) which may be, for example, the manufacturer of removable memory card 230.

In the illustrated implementation, host 250 may be electrically coupled to removable memory card 230 via connector 220. Host 250 may include update manager 252 and transceiver ("TX/RX") 254. Removable memory card 230 may include memory controller 110 in some embodiments. As described hereinabove, memory controller 110 may be configured to read and write data from/to non-volatile memory 130.

Update manager 252 may be configured to issue commands and relay new firmware (from upgrade data stream 202) via transceiver ("TX/RX") 254 to removable memory card 230. Also, update manager 252 may be configured to issue another command to conclude firmware update. TX/RX 254 may be configured to send commands and new firmware to removable memory card 230 during an update operation, while providing host 250 access to application data 131. In various embodiments, either host 250 or removable memory card 230, or both, can each operate concurrently in a functional mode and an upgrade mode, for example.

In one embodiment, removable memory card 230 can be a flash memory card of any kind using any type of flash memory. Examples of flash memory include NOR, AND, Divided bit-line NOR (DINOR), Not AND (NAND), and other flash memories. In at least one embodiment, host 250 can be any electronic device that implements non-volatile memory. Examples of such electronic devices include digital cameras, MP3 music players, handheld computing devices, cellular phones, and other electronic devices requiring removable storage. Examples of flash memory cards include a variety of the following trademarked products Secure Digital™ (compliant with specifications maintained by the SD Card Association of San Ramon, Calif.), MultiMediaCard™ (compliant with specifications maintained by the MultiMediaCard Association ("MMCA") of Palo Alto, Calif.), MiniSD™ (as manufactured by SanDisk, Inc.), MicroSD™ (as manufactured by SanDisk, Inc.), CompactFlash™ (compliant with specifications maintained by the CompactFlash Association ("CFA") of Palo Alto, Calif.), SmartMedia™ (compliant with specifications maintained by the Solid State Floppy Disk Card ("SSFDC") Forum of Yokohama, Japan), xD-Picture Card™ (compliant with specifications maintained by the xD-Picture Card Licensing Office of Tokyo, Japan), Memory Stick™ (compliant with specifications maintained by the Solid State Floppy Disk Card ("SSFDC") Forum of Yokohama, Japan), TransFlash™ (as manufactured by SanDisk, Inc.), and other flash memory cards. In at least one instance, removable memory card 730 can be implemented as a non-removable memory device.

Figure 3:
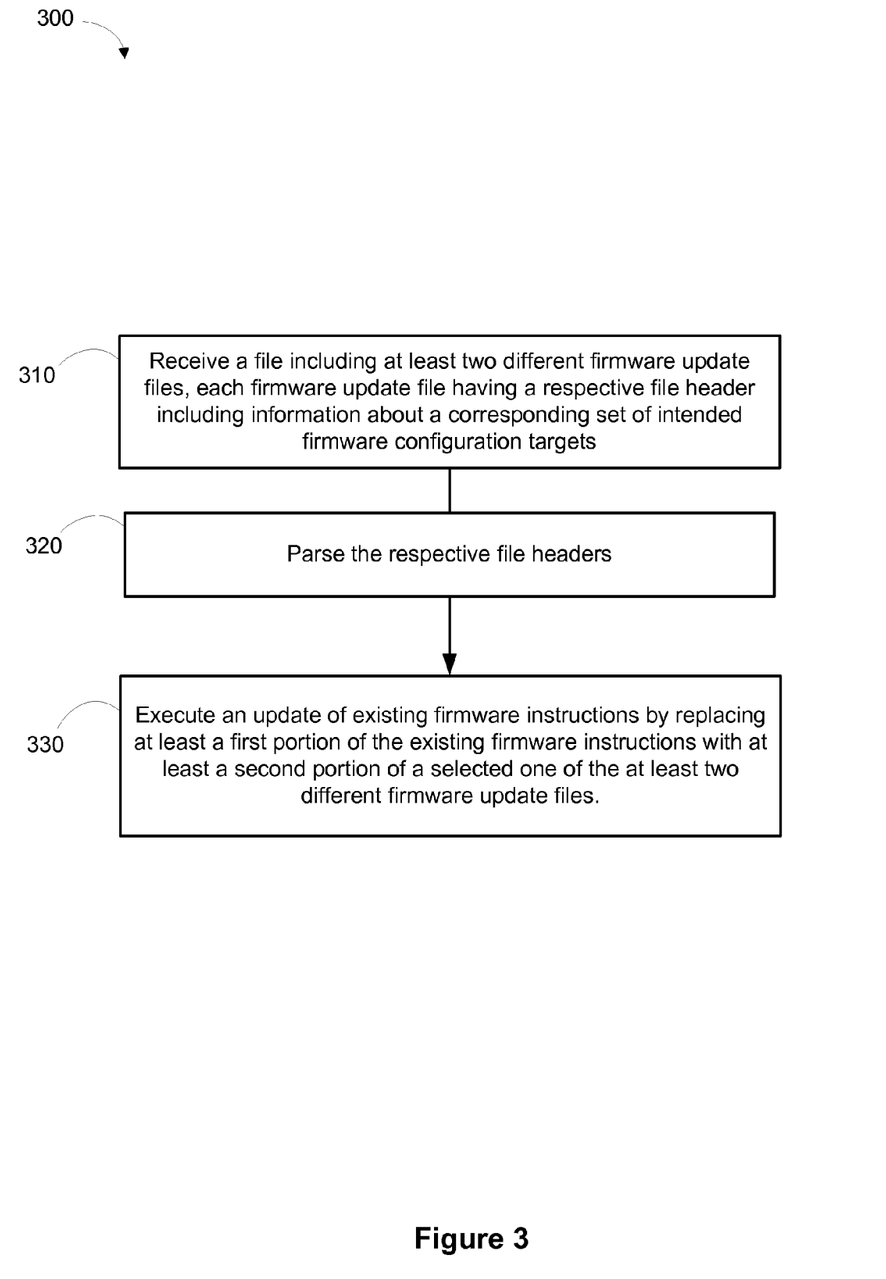
FIG. 3 is a flow diagram illustrating an example of a method for upgrading firmware stored in a non-volatile memory, according to an embodiment.

Referring now to FIG. 3, a process for updating firmware instructions residing on a device will be described. The device may be a non-volatile memory and/or a removable memory card as described hereinabove. Process 300 may begin at block 310 by receiving a file package that includes at least two different firmware update files, each firmware update file having a respective file header including information about a corresponding set of intended firmware configuration targets. The firmware update files may be UBF's, as described in more detail hereinbelow.

Figure 4:
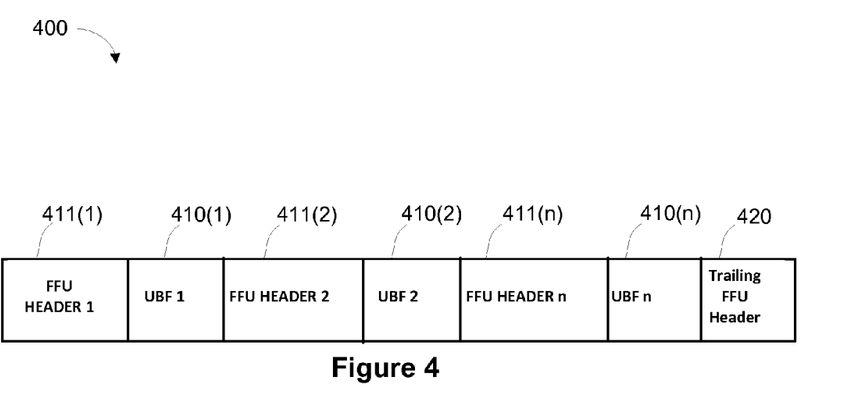
FIG. 4 is a diagram illustrating structure of a firmware file update package according to an embodiment.

Referring now to FIG. 4, it is illustrated that received file package 400 may be structured as a concatenated series of UBF's 410(i), each UBF having an associated field firmware update (FFU) header 411(i). In an implementation, an FFU header 411(i) may be one sector in length and have the structure illustrated in FIG. 5. In the illustrated implementation, for example, FFU header 411(i) may have four fields. First field 501 may be up to four bytes in length and have the function of identifying the length of the associated UBF. A value of first field 501 that is set to may signify the end of file package 400.

Figure 5:
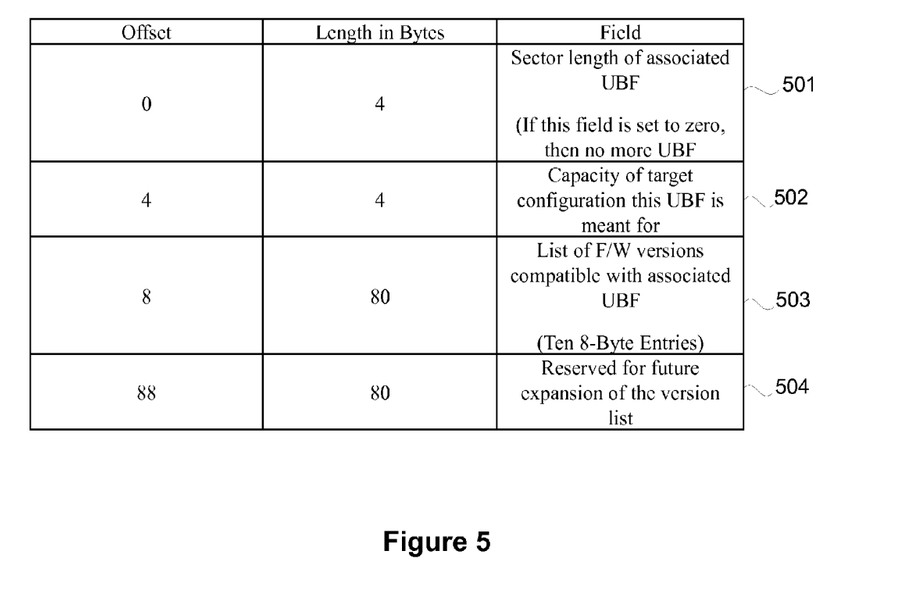
FIG. 5 is a diagram illustrating structure of firmware file update header.

Also in the illustrated implementation, second field 502 and third field 503 of FFU header 411(i) may, together identify an intended firmware configuration target, by which is meant the configuration of firmware for which updating by UBF 410(i) is intended. More particularly, firmware configuration target may be defined by field 502, which identifies the memory capacity with which UBF 410(i) is compatible, and field 503, which identifies the list of firmware versions with which UBF 410(i) is compatible. In the illustrated implementation, field 502 may be up to four bytes in length. Field 503 may, for example, be up to 80 bytes in length and include up to ten 8-byte entries, each entry identifying a particular firmware version with which UBF 410(i) is compatible. Fourth field 504 may, for example, be up to 80 bytes in length and include up to ten additional 8-byte entries, each additional entry identifying a particular firmware version with which UBF 410(i) is compatible.

It will be appreciated that FFU header 411(i) may have a dual function: first, FFU header 411(i) may provide information about a corresponding set of intended firmware configuration targets, particularly memory capacity and firmware version associated with each target; second FFU header 411(i) may indicate whether an additional UBF (that is, UBF 410(i+1)) follows UBF 410(i).

Referring again to FIG. 4, file package 400 may, optionally, include trailing FFU header 420 that may signify that no further UBF is included in file package 400.

Returning to FIG. 3, at block 320, the respective file headers may be parsed by the existing firmware on the device so as to identify, based on information in each FFU header, whether to select a UBF associated with that header for updating the device.

At block 330, an update of the existing firmware instructions residing on the device may be executed, by replacing at least a first portion of the existing firmware instructions with at least a second portion of a UBF selected based on the parsing process of block 320. It will be appreciated that a UBF so selected will be selected based on information in its associated header indicating that the selected UBF is compatible with the memory capacity and existing firmware version of the device.

Figure 6:
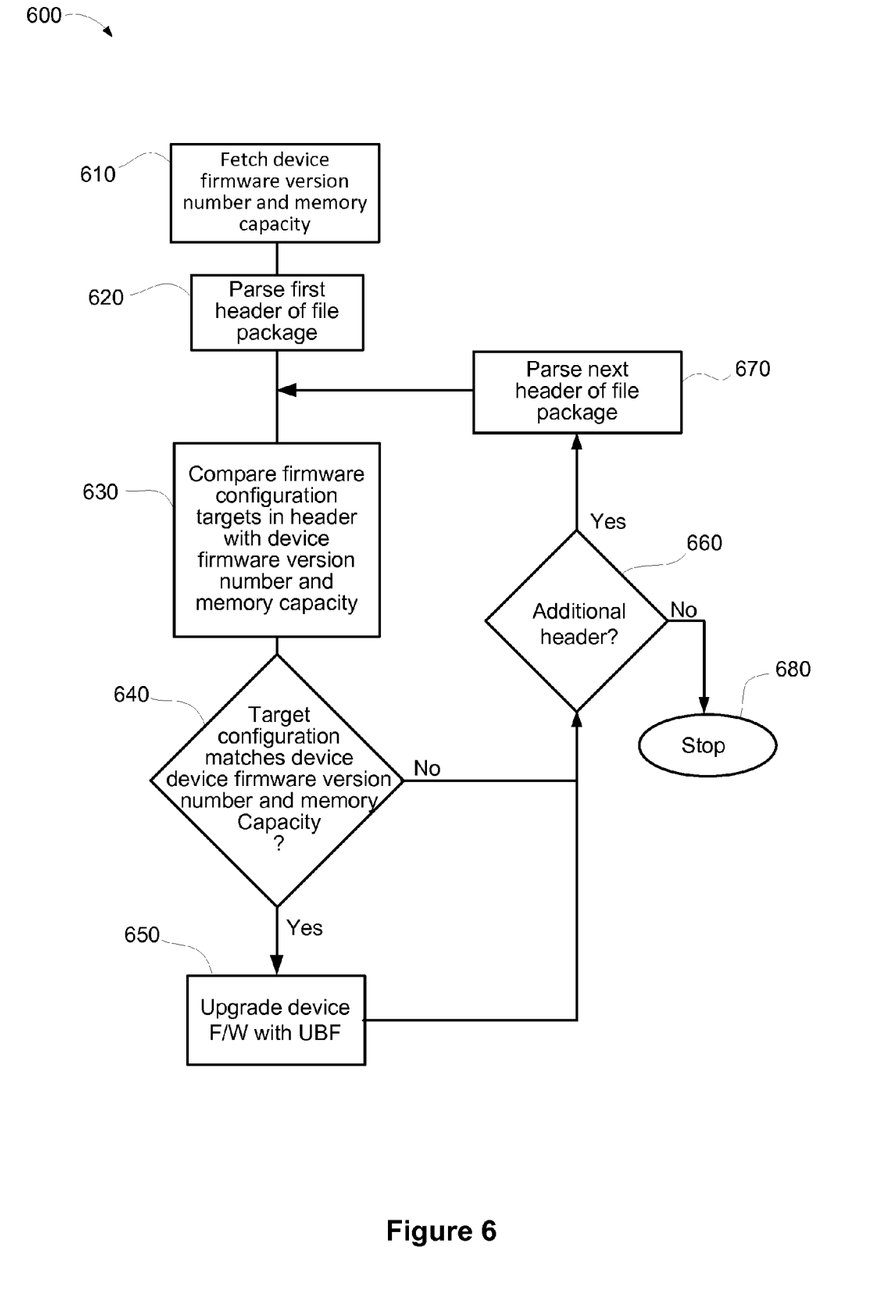
FIG. 6 is a flow diagram illustrating an example of a method for upgrading firmware stored in a non-volatile memory, according to an embodiment.

Referring now to FIG. 6, a further implementation of a process for updating firmware instructions residing on a device will be described. The device may be a non-volatile memory and/or a removable memory card as described hereinabove. The process may be executed by a memory controller on the device. Process 600 may begin at block 610 by fetching firmware version number and non-volatile memory capacity of the device. This information may be stored in firmware or be otherwise available to the memory controller.

The process may continue at block 620 by parsing a first header of a received file package that includes at least two different firmware update files. For a received a file package that includes at least two different firmware update files, each firmware update file may include a respective file header including information about a corresponding set of intended firmware configuration targets. The firmware update files may be UBF's, and the respective file header may be a FFU header as described hereinabove. The information about the corresponding set of intended firmware configuration targets may include (i) a non-volatile memory capacity, and (ii) one or more firmware versions with which the UBF is compatible.

The process may continue at block 630 by comparing firmware configuration targets in the header with the device firmware version number and memory capacity. At block 640, a determination may be made as to whether one or more of the configuration targets in the header match the device firmware version number and memory capacity. If the determination is that no match exists, the process may proceed to block 660.

On the other hand, if the determination is that a match exists, the process may proceed to block 650 and upgrade the device firmware with at least a portion of the UBF file associated with the header. The process may then proceed to block 660.

At block 660, a determination may be made as to whether there is an additional header. When the determination is made that there is an additional header, the process may proceed to block 630. Otherwise, the process may be considered finished and proceed to block 680.

Thus, techniques for updating, with a common update file, firmware residing on multiple non-volatile memory devices having diverse configurations have been disclosed. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for updating firmware instructions on a first device, the method comprising:
   receiving, at the first device, a file comprising at least two different firmware update files, each firmware update file comprising a respective file header that has information about aset of intended firmware configuration targets, wherein the first device comprises a first set of firmware instructions of a first configuration;
   parsing the respective file headers to identify one or more firmware update files which corresponds to the first configuration, wherein the identification includes those firmware update files that correspond with any of the set of intended firmware configuration targets that matches the first configuration;
   executing, by the first device, a first update by updating the first set of firmware instructions by replacing at least a first portion of the first set of firmware instructions with at least a second portion of the identified firmware update file which corresponds to the first configuration; and
   executing a subsequent update, by the first device, of an existing set of firmware instructions on the first device by replacing at least a third portion of the existing firmware instructions with at least a fourth portion of a different identified one of the at least two different firmware update files.

2. The method of claim 1, further comprising:
   receiving the file at a second device, the second device comprising a second set of firmware instructions of a second configuration;
   parsing the respective file headers to identify the firmware update file which corresponds to the second configuration, wherein the identification is based on comparing each of the set of intended firmware configuration targets with the second configuration; and
   executing, by the second device, a second update by updating the second set of firmware instructions by replacing at least a first portion of the second set of firmware instructions with at least a third portion of the identified firmware update file which corresponds to the first configuration.

3. The method of claim 1, wherein the first configuration defines a memory capacity of the first device and an existing firmware version of the first device.

4. The method of claim 1, wherein the information includes memory capacity, and firmware version of each intended firmware configuration target.

5. The method of claim 1,
   wherein, prior to executing the subsequent update, the existing set of firmware instructions causes the first device to parse the respective file headers such that the identified one or more intended firmware update files comprise only those firmware update files for which the first configuration is included in the corresponding set of intended firmware configuration targets.

6. The method of claim 1, wherein the first device comprises a non-volatile memory array.

7. The method of claim 6, wherein the non-volatile memory array comprises a flash memory.

8. An apparatus comprising:
   a non-volatile memory array, the non-volatile memory array including firmware instructions; and
   a memory controller for communicating with the non-volatile memory array; the memory controller configured to:
      receive a file comprising at least two different firmware update files, wherein each of the firmware update files comprises a respective file header that has information about a corresponding set of intended firmware configuration targets, further wherein the non-volatile memory array comprises a first set of firmware instructions of a first configuration;
      parse the respective file headers to identify one or more of the firmware update files, wherein the identification is based on comparing the set of intended firmware configuration targets with the first configuration, wherein the identified one or more of the firmware update files correspond with the intended firmware configuration targets that match with the first configuration;

execute a first update of the first set of firmware instructions by replacing at least a first portion of the first set of firmware instructions with at least a second portion of the identified one or more of the firmware update files; and execute a subsequent update, by the apparatus, of an existing set of firmware instructions on the apparatus by replacing at least a third portion of the existing firmware instructions with at least a fourth portion of a different identified one of the at least two different firmware update files.

9. The apparatus of claim 8, wherein the first configuration defines a memory capacity of the apparatus and an existing firmware version of the apparatus.

10. The apparatus of claim 8, wherein the information includes memory capacity, and firmware version of each intended firmware configuration target.

11. The apparatus of claim 8,
wherein, prior to executing the subsequent update, the existing set of firmware instructions causes the apparatus to parse the respective file headers such that the identified one or more intended firmware update files comprise only those firmware update files for which the first configuration is included in the corresponding set of intended firmware configuration targets.

12. The apparatus of claim 11, wherein the non-volatile memory array comprises a flash memory.

13. A non-transitory computer-readable storage medium having stored thereon instructions which, when executed by a controller, cause the controller to perform operations, the operations comprising:

receiving, at a first device, a file, the file comprising at least two different firmware update files, each firmware update file comprising a respective file header, each file header having information about a corresponding set of intended firmware configuration targets, the first device comprising a first set of firmware instructions of a first configuration;

executing a first update, by the first device, of the first set of firmware instructions by replacing at least a first portion of the first set of firmware instructions with at least a second portion of a selected one or more of the at least two different firmware update files;

wherein, prior to executing the update, the first set of firmware instructions causes the first device to parse the respective file headers such that the selected one or more firmware update files comprise only those firmware update files for which the first configuration is included in the corresponding set of intended firmware configuration targets; and executing a subsequent update, by the first device, of an existing set of firmware instructions on the first device by replacing at least a third portion of the existing firmware instructions with at least a fourth portion of a different selected one of the at least two different firmware update files.

14. The storage medium of claim 13, wherein the operations are further comprising:

receiving the file at a second device, the second device comprising a second set of firmware instructions of a second configuration;

executing a second update, by the second device, of the second set of firmware instructions by replacing at least a first portion of the second set of firmware instructions with at least a third portion of a selected one of the at least two different firmware update files; wherein, prior to executing the second update, the second set of firmware instructions causes the second device to parse the respective file headers such that the selected one or more firmware update files comprise only those firmware update files for which the second configuration is included in the corresponding set of intended firmware configuration targets.

15. The storage medium of claim 13, wherein the first configuration defines a memory capacity of the first device and an existing firmware version of the first device.

16. The storage medium of claim 13, wherein the information includes memory capacity, and firmware version of each intended firmware configuration target.

17. The storage medium of claim 13,
wherein, prior to executing the subsequent update, the existing set of firmware instructions causes the first device to parse the respective file headers such that the selected one or more intended firmware update files comprise only those firmware update files for which the first configuration is included in the corresponding set of intended firmware configuration targets.

18. The storage medium of claim 13, wherein the first device comprises a non-volatile memory array.

19. The storage medium of claim 18, wherein the non-volatile memory array comprises a flash memory.

* * * * *